Patented Aug. 4, 1942

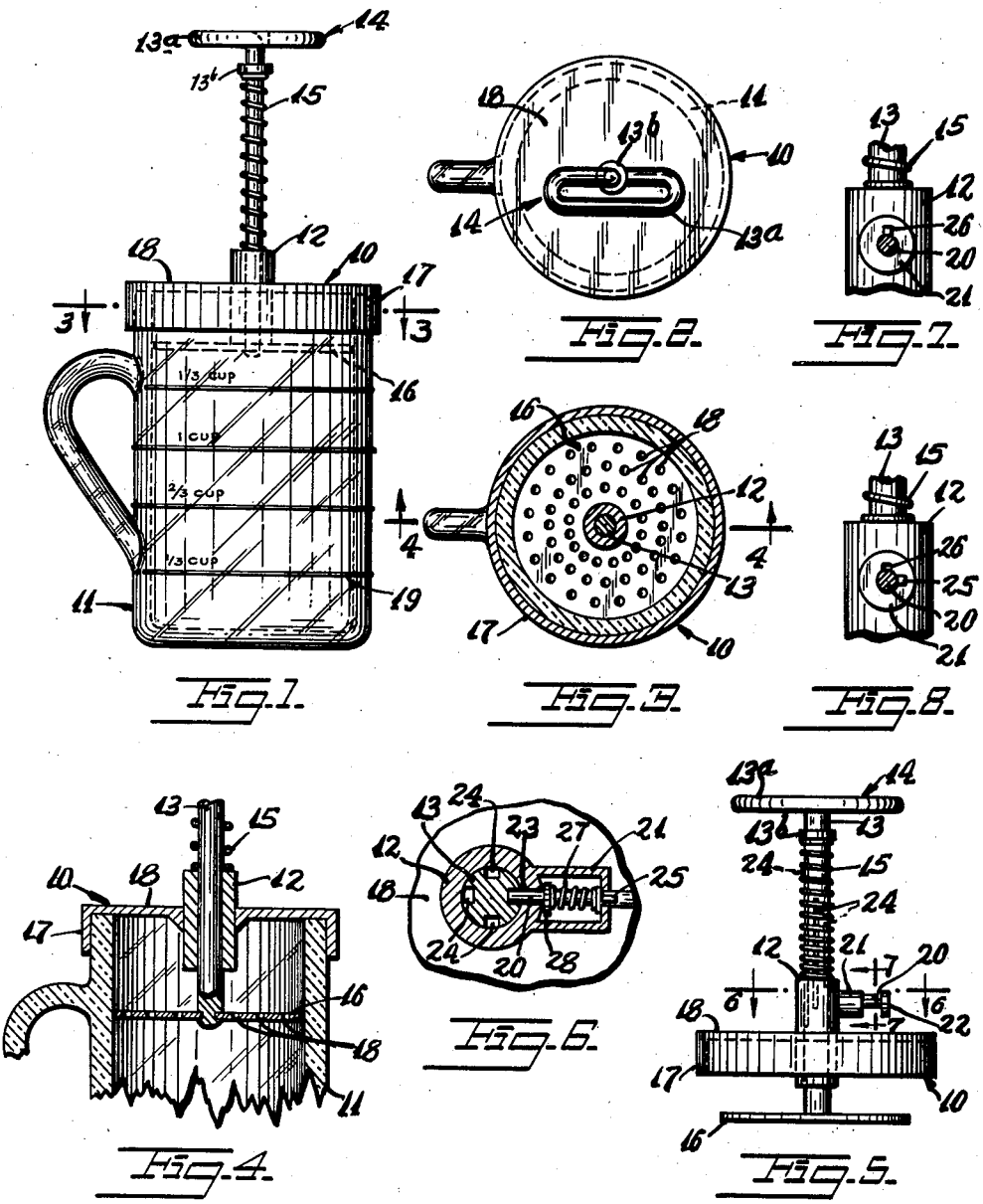

2,291,708

UNITED STATES PATENT OFFICE 2,291,708

BEATER FOR WHIPPING CREAM, EGGS, ETC.

Henry Gluck, Brooklyn, N. Y.

Application January 9, 1942, Serial No. 426,135

6 Claims. (Cl. 259—113)

This invention relates to new and useful improvements in a beater for whipping cream, eggs, etc.

More specifically, the invention proposes to characterize the beater by a cover or bonnet which may be engaged on a jar or other vessel and which slidably supports a resiliently urged plunger which is provided with a beater member acting within said jar or vessel.

The invention proposes to characterize said beater member by the fact that it comprises a perforated disc preferably of stainless steel or other suitable metals, or plastic materials.

Still further the invention proposes to provide the plunger with a top handle which is preferably formed from the material thereof.

Another object of the invention resides in providing a bushing which is mounted on the cover in such a way as to slidably accommodate the plunger.

Still further the invention contemplates the provisions of means of limiting sliding of said plunger through several selected distances.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure—

Fig. 1 is a side elevational view of a beater constructed in accordance with this invention.

Fig. 2 is a plan view of Fig. 1.

Fig. 3 is a horizontal sectional view taken on the line 3—3 of Fig. 1.

Fig. 4 is a fragmentary vertical sectional view taken on the line 4—4 of Fig. 3.

Fig. 5 is a side elevational view of a beater constructed in accordance with a modification of this invention.

Fig. 6 is a horizontal enlarged sectional view taken on the line 6—6 of Fig. 5.

Fig. 7 is a fragmentary enlarged vertical sectional view taken on the line 7—7 of Fig. 5.

Fig. 8 is a view similar to Fig. 7 but illustrating the parts in a different position.

The beater for whipping cream, eggs, and the like, includes a cover 10 for engaging upon a jar 11 or other vessel. A bushing 12 is mounted through the cover 10. A plunger 13 is slidably engaged through the bushing 12 and has a handle 14 at its top end. A spring 15 urges the plunger 13 upwards. A beater member 16 is mounted upon the bottom end of the plunger 13.

The cover 10 is in the form of a metal shell having a wall 17 engaging around the sides of the jar 11 and a top wall 18. The bushing 12 is mounted through the top wall 18. It is secured in position in accordance with standard machine shop or production practice. The plunger 13 is in the form of a heavy and rigid wire or a rod. The handle 14 is formed by bending the top portion of the plunger 13 into a loop shaped configuration 13ª as illustrated in Fig. 2. The spring 15 is coaxially mounted on the plunger 13 and acts upon the top of the bushing 12, and against a collar 13ᵇ fixedly mounted on the plunger 13.

The beater member 16 comprises a disc having perforations 18. This disc may be constructed of stainless steel or other suitable metals, plastic materials, or glass. The jar 11 is shown provided with graduations 19 to indicate its capacity.

In Figs. 5-8 inclusive a modified form of the invention is disclosed which distinguishes from the prior form in the fact that it is provided with means for limiting sliding of the plunger 13 through selected distances. This means includes a bolt 20 slidably mounted through a boss 21 formed on the side of the bushing 12. The bolt 20 is provided at its outer end with a head 22 by which it may be gripped and moved. The inner end of the plunger 20 passes through an opening 23 formed in the bushing 12 and engages in one of a plurality of longitudinally extending slots 24 formed in the sides of the plunger 13. These slots 24 are of different lengths, as clearly illustrated in Fig. 5. The bolt 20 is also provided with a key 25 which normally engages a key opening 26 formed in the boss 21.

A spring 27 is coaxially mounted on the bolt 20 within the boss 21 which is hollowed out for this purpose. The spring 27 acts between the outer end of the boss 21 and a collar 28 mounted on the bolt 20. The bolt 20 may be pulled outwards to disengage the key 25 from the key opening 26 and then the bolt may be turned to disalign the key 25 from the key opening 26. The bolt is now held in an extended position in which the inner end does not engage any of the slots 24. The plunger 13 is now completely free and may be moved through its complete amplitude. To limit the plunger 13 it may be turned so that a selected one of the slots 24 is in alignment with the opening 23 and then the bolt 20 is caused to engage this particular slot 24. The ends of the slot 24 striking the bolt 20 limits the sliding thereof.

The operation of the beater is as follows:

Cream, eggs, or other material which is to be whipped is placed in the jar 11 or other vessel for this purpose. The cover 10 is then engaged on the jar or vessel. The plunger 13 is then reciprocated. This is done by pressing it downwards with the palm of the hand engaging on the handle 13a, and then moving the hand up so that the spring 15 may return the plunger to its raised position. This reciprocation of the plunger is transmitted to the beater 16 and beats and whips the substance in the jar 11.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Patent is:

1. A beater for whipping cream, eggs, etc., comprising a cover for a jar or other vessel, a bushing mounted on and through said cover, a plunger slidably engaged through said bushing and having a handle at its top end, a spring urging said plunger upwards, a beater member mounted on the bottom of said plunger, and means for limiting sliding of said plunger through several selected distances, comprising a bolt mounted upon said bushing and selectively engageable with one of a plurality of slots formed longitudinally on the sides of said plunger, said slots being of different lengths.

2. A beater for whipping cream, eggs, etc., comprising a cover for a jar or other vessel, a bushing mounted on and through said cover, a plunger slidably engaged through said bushing and having a handle at its top end, a spring urging said plunger upwards, a beater member mounted on the bottom of said plunger, and means for limiting sliding of said plunger through several selected distances, comprising a bolt mounted upon said bushing and selectively engageable with one of a plurality of slots formed longitudinally on the sides of said plunger, said slots being of different lengths, and means for holding said bolt in an inoperative position.

3. A beater for whipping cream, eggs, etc. comprising a cover for a jar or other vessel, a bushing mounted on and through said cover, a plunger slidably engaged through said bushing and having a handle at its top end, a spring urging said plunger upwards, a beater member mounted on the bottom of said plunger, and means for limiting sliding of said plunger through several selected distances, comprising a bolt mounted upon said bushing and selectively engageable with one of a plurality of slots formed longitudinally on the sides of said plunger, said slots being of different lengths, and means for resiliently urging said bolt into an operative position.

4. A beater comprising a cover for a jar or other container and having a bushing fixedly extended therethrough to slidably support a plunger to be oscillated vertically, said plunger being formed with a plurality of slots each of a different length, and a bolt extended radially of said bushing and selectively engageable with one of said slots for controlling the amplitude of oscillation.

5. A beater comprising a cover for a jar or other container and having a bushing fixedly extended therethrough to slidably support a plunger to be oscillated vertically, said plunger being formed with a plurality of slots each of a different length, and a bolt extended radially of said bushing and selectively engageable with one of said slots for controlling the amplitude of oscillation, said bushing being formed with a hollow boss through which said bolt is slidably extended, a collar fixedly mounted on said bolt within said boss, and a spring coaxially mounted on said bolt within said boss and operating between said collar and the end wall of said boss for urging said bolt to retain its engaged position with one of said slots.

6. A beater comprising a cover for a jar or other container and having a bushing fixedly extended therethrough to slidably support a plunger to be oscillated vertically, said plunger being formed with a plurality of slots each of a different length, and a bolt extended radially of said bushing and selectively engageable with one of said slots for controlling the amplitude of oscillation, said bushing being formed with a hollow boss through which said bolt is slidably extended, a collar fixedly mounted on said bolt within said boss, and a spring coaxially mounted on said bolt within said boss and operating between said collar and the end wall of said boss for urging said bolt to retain its engaged position with one of said slots, and a key formed on said bolt and normally engaging a cutout in said boss and engageable against the end of said boss in a pulled out and turned position of said bolt for retaining said bolt in an inoperative position free of said slots against the action of said spring.

HENRY GLUCK.